US011150524B2

(12) United States Patent
Ozeki et al.

(10) Patent No.: US 11,150,524 B2
(45) Date of Patent: Oct. 19, 2021

(54) DISPLAY DEVICE

(71) Applicant: Japan Display Inc., Minato-ku (JP)

(72) Inventors: Yoshitaka Ozeki, Tokyo (JP);
Tadayoshi Katsuta, Tokyo (JP); Koji Ishizaki, Tokyo (JP); Takahiro Takeuchi, Tokyo (JP); Koshiro Moriguchi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 311 days.

(21) Appl. No.: 16/361,508

(22) Filed: Mar. 22, 2019

(65) Prior Publication Data

US 2019/0302509 A1    Oct. 3, 2019

(30) Foreign Application Priority Data

Mar. 28, 2018 (JP) .............................. JP2018-062272

(51) Int. Cl.
| *G02F 1/1343* | (2006.01) |
| *G02F 1/1333* | (2006.01) |
| *G02F 1/1362* | (2006.01) |
| *G02F 1/15* | (2019.01) |
| *G02F 1/1514* | (2019.01) |

(52) U.S. Cl.
CPC ...... *G02F 1/13439* (2013.01); *G02F 1/13624* (2013.01); *G02F 1/133345* (2013.01); *G02F 1/134309* (2013.01); *G02F 1/136227* (2013.01); *G02F 1/136277* (2013.01); *G02F 1/136213* (2013.01); *G02F 1/1514* (2019.01)

(58) Field of Classification Search
CPC ............. G02F 1/1368; G02F 1/136286; G02F 1/136213; G02F 1/134309; G02F 1/1362; G02F 1/136227; G02F 1/13439; G02F 1/133345; G02F 1/134372; G02F 1/13454; G02F 1/13624; G02F 1/136277; G02F 1/134336; G02F 1/15; G02F 1/1514; G02F 1/16766; G02F 2201/123; G02F 2201/121; G09G 2300/0426
See application file for complete search history.

(56) References Cited

U.S. PATENT DOCUMENTS

| 7,947,985 B2 * | 5/2011 | Kim ...................... H01L 27/124 257/72 |
| 2008/0100566 A1 * | 5/2008 | Miyasaka ............ G09G 3/3446 345/107 |
| 2012/0249940 A1 * | 10/2012 | Choi ..................... G02F 1/1393 349/123 |

FOREIGN PATENT DOCUMENTS

JP          2011-221097          11/2011

* cited by examiner

*Primary Examiner* — Thoi V Duong
(74) *Attorney, Agent, or Firm* — Oblon, McClelland, Maier & Neustadt, L.L.P.

(57) ABSTRACT

According to one embodiment, a display device includes a base substrate, a switching element including a semiconductor layer, a power supply line, a pixel electrode electrically connected to the switching element, a capacitance electrode positioned between the base substrate and the pixel electrode and electrically connected to the power supply line, a first interlayer insulating film positioned between the pixel electrode and the capacitance electrode, a common electrode, and an electrophoretic element positioned between the pixel electrode and the common electrode. An edge of the capacitance electrode overlaps the pixel electrode over the entire periphery thereof.

20 Claims, 13 Drawing Sheets

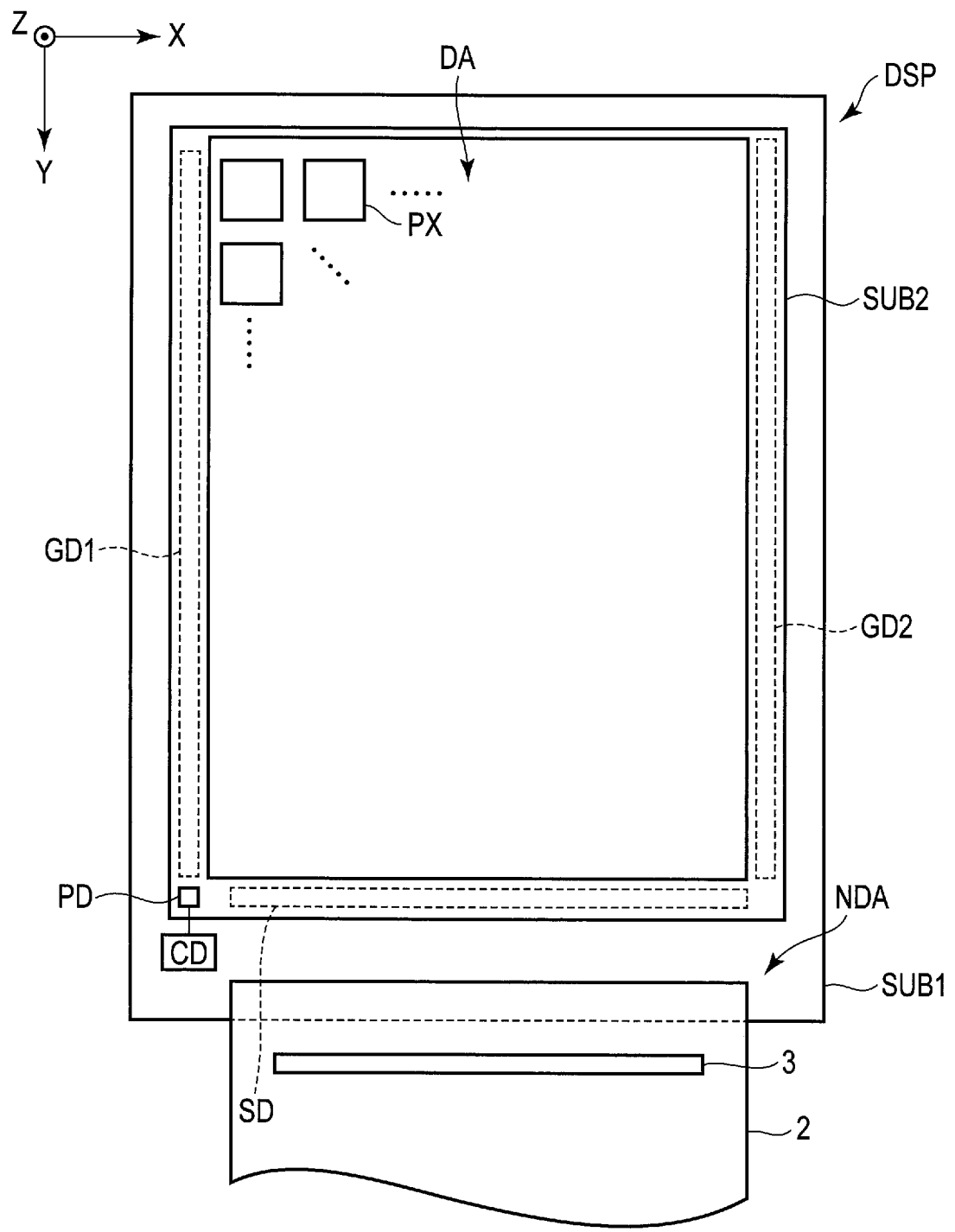
F I G. 1

DISPLAY DEVICE

CROSS-REFERENCE TO RELATED APPLICATIONS

This application is based upon and claims the benefit of priority from Japanese Patent Application No. 2018-062272, filed Mar. 28, 2018, the entire contents of which are incorporated herein by reference.

FIELD

Embodiments described herein relate generally to a display device.

BACKGROUND

For example, an electrophoretic display device in which an electrophoretic element is held between an element substrate and a counter substrate is known. In such an electrophoretic display device, a capacitance electrode is formed over substantially the entire surface of the display part, and all pixel electrodes overlap the capacitance electrode. Therein, an electric field from the capacitance electrode may leak through gaps of adjacent pixel electrodes. The leaked electric field in gaps of the pixel electrodes may cause an erroneous action of the electrophoretic element and deterioration of display quality.

BRIEF DESCRIPTION OF THE DRAWINGS

FIG. 1 is a plan view of an example of a display device DSP of an embodiment.

DETAILED DESCRIPTION

Figure 2:
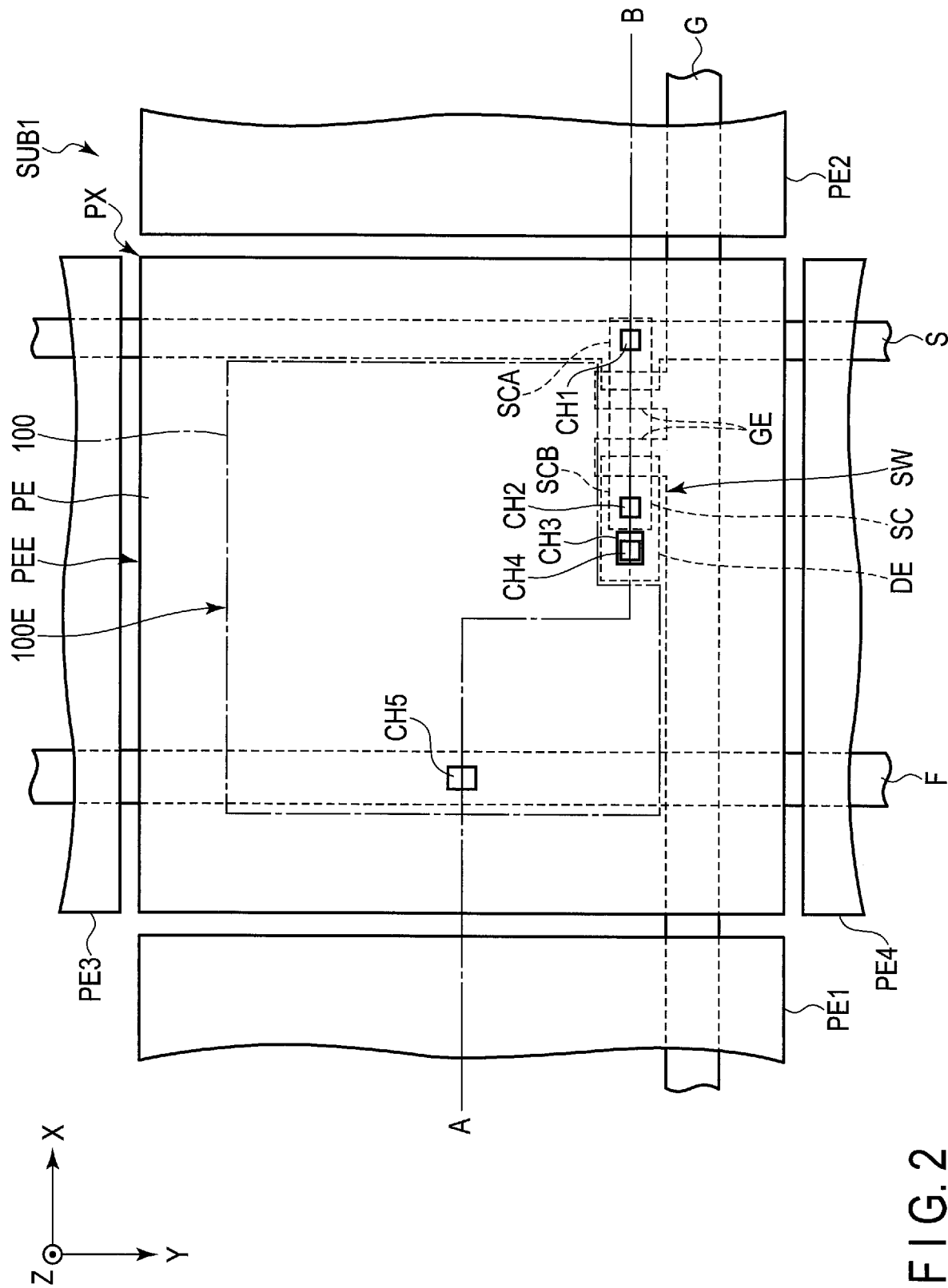
FIG. 2 is a plan view showing a first structural example of a pixel PX of the display device DSP of FIG. 1.

In general, according to one embodiment, a display device includes a base substrate, a switching element including a semiconductor layer, a power supply line, a pixel electrode electrically connected to the switching element, a capacitance electrode positioned between the base substrate and the pixel electrode and electrically connected to the power supply line, a first interlayer insulating film positioned between the pixel electrode and the capacitance electrode, a common electrode, and an electrophoretic element positioned between the pixel electrode and the common electrode. An edge of the capacitance electrode overlaps the pixel electrode over the entire periphery thereof.

According to another embodiment, a display device includes a base substrate, a first pixel electrode and a second pixel electrode arranged aside with a gap part, a capacitance electrode including a first capacitance part positioned between the base substrate and the first pixel electrode, a second capacitance part positioned between the base substrate and the second pixel electrode, and a connection part connecting the first capacitance part and the second capacitance part, a first interlayer insulating film positioned between the first pixel electrode and the first capacitance part and between the second pixel electrode and the second capacitance part, a common electrode, and an electrophoretic element positioned between the first pixel electrode and the common electrode and between the second pixel electrode and the common electrode. The first capacitance part overlaps the first pixel electrode, the second capacitance part overlaps the second pixel electrode, the connection part overlaps the gap part, and a width of the connection part is less than each width of the first capacitance part and the second capacitance part.

According to yet another embodiment, a display device includes a base substrate, a switching element including a semiconductor layer, a power supply line, a pixel electrode electrically connected to the switching element, an organic insulating film positioned between the power supply line and the pixel electrode, a capacitance electrode positioned between the organic insulating film and the pixel electrode and connected to the power supply line in a through hole passing through the organic insulating film, and a first interlayer insulating film positioned between the pixel electrode and the capacitance electrode. The capacitance electrode is a transparent electrode, and an edge of the capacitance electrode overlaps the pixel electrode over the entire periphery thereof.

Hereinafter, embodiments will be explained with reference to accompanying drawings. Note that, the disclosure is an example, and the contents of the following description do not limit the scope of the invention. Variations which will easily be conceivable by a person having ordinary skill in the art are naturally encompassed within the scope of the invention. In the figures, dimensions of components may be depicted schematically as compared to actual models of the invention for easier understanding. Elements corresponding to each other between different figures will be referred to by the same reference number, and explanation considered redundant may be omitted.

FIG. 1 is a plan view showing an example of a display device DSP of an embodiment. In this example, a first direction X, second direction Y, and third direction Z are orthogonal to each other; however, they may cross each other at an angle other than 90 degrees. The first direction X and the second direction Y correspond to a direction parallel to the main surface of a substrate of the display device DSP, and the third direction Z corresponds to a thickness direction of the display device DSP. In this application, a position in a tip side of an arrow representing the third direction Z will be referred to as above (or up), and a position in a base side of the arrow will be referred to as below (or down). Furthermore, when an observation position is hypothetically set in the tip side of the arrow representing the third direction Z to observe the display device DSP, seeing an X-Y plane defined by the first direction X and the second direction Y will be referred to as plan view.

The display device DSP includes a first substrate SUB1 and a second substrate SUB2. A display part DA to display an image is positioned in an area where the first substrate SUB1 and the second substrate SUB2 overlap with each other in a plan view. The display part DA includes a plurality of pixels PX arranged in a matrix in the first direction X and the second direction Y. A non-display part NDA around the display part DA is shaped as a frame. Gate drivers GD1 and GD2 and a source driver SD are positioned in the non-display part NDA and are provided with the first substrate SUB1. Furthermore, a power supply pad PD is positioned in the non-display part NDA and is provide with the first substrate SUB1 to overlap the second substrate SUB2. The power supply pad PD is connected to a power source CD of common potential.

A flexible printed circuit 2 is connected to the first substrate SUB1. An IC chip 3 is connected to the flexible printed circuit 2. Note that the IC chip 3 may be connected to the first substrate SUB1. The gate drivers GD1 and GD2, source driver SD, and power source CD may be included in the IC chip 3.

FIG. 2 is a plan view showing a first structural example of a pixel PX of the display device DSP of FIG. 1. In this example, only the main elements of the pixels PX of the first substrate SUB1 of FIG. 1 are shown. The first substrate SUB1 includes a scan line G, signal line S, power supply line F, switching element SW, pixel electrode PE, and capacitance electrode 100.

The scan line G extends in the first direction X, and is connected to one of the gate drivers GD1 and D2 of FIG. 1. The power supply line F and the signal line S are arranged in the first direction X with a gap therebetween and do not cross each other. The signal line S extends in the second direction Y and is connected to the source driver SD of FIG. 1. The power supply line F extends in the second direction Y and is connected to the power source CD of common potential shown in FIG. 1. In the example depicted, as to a width along the first direction X, a width of the power supply line F is greater than a width of the signal line S.

The switching element SW is positioned in a crossing portion of the scan line G and the signal line S. The switching element SW includes a semiconductor layer SC, gate electrode GE, and drain electrode DE. The switching element SW in the figure has a double gate structure; however, it may have a single gate structure. Furthermore, the switching element SW may have a top gate structure in which the gate electrode GE is disposed above the semiconductor layer SC, or may have a bottom gate structure in which the gate electrode GE is disposed below the semiconductor layer SC.

The semiconductor layer SC includes an end SCA overlapping the signal line S and an end SCB overlapping the drain electrode DE. The end SCA is electrically connected to the signal line S in a through hole CH1. The end SCB is electrically connected to the drain electrode DE in a through hole CH2. The semiconductor layer SC crosses the scan line G between the ends SCA and SCB. The gate electrode GE corresponds to an area overlapping the semiconductor layer SC of the scan line G. The drain electrode DE is shaped as an island and is positioned between the power supply line F and the signal line S.

The capacitance electrode 100 overlaps the power supply line F and is electrically connected to the power supply line F in the through hole CH5. On the other hand, the capacitance electrode 100 does not overlap the scan line G, signal line S, or switching element SW in order to reduce the load caused by a parasitic capacitance. In the example depicted, the capacitance electrode 100 is shaped as a flat plate and does not include an opening therein.

A pixel electrode PE overlaps, in the pixels PX, the capacitance electrode 100, switching element SW, scan line G, signal line S, and power supply line F. The pixel electrode PE is electrically connected to the drain electrode DE in the through holes CH3 and CH4. In the example depicted, the pixel electrode PE is formed as a square in which a length along the first direction X and a length along the second direction Y are equal; however, this is merely an example. The pixel electrode PE may be formed as a rectangle extending in the first direction X or the second direction Y, or may be formed as another polygon.

In a plan view, an edge 100E of the capacitance electrode 100 overlaps the pixel electrode PE in the entire periphery thereof as shown with a single-dotted line. That is, the capacitance electrode 100 does not extend in the outside of the pixel electrode PE. An edge PEE of the pixel electrode PE is positioned outside the capacitance electrode 100.

As shown in the figure, four pixel electrodes PE1 to PE4 are arranged around the pixel electrode PE. The capacitance electrode 100 does not exist between the pixel electrodes PE and PE1, or between the pixel electrodes PE and PE2, or between the pixel electrodes PE and PE3, or between the pixel electrodes PE and PE4.

Figure 3:
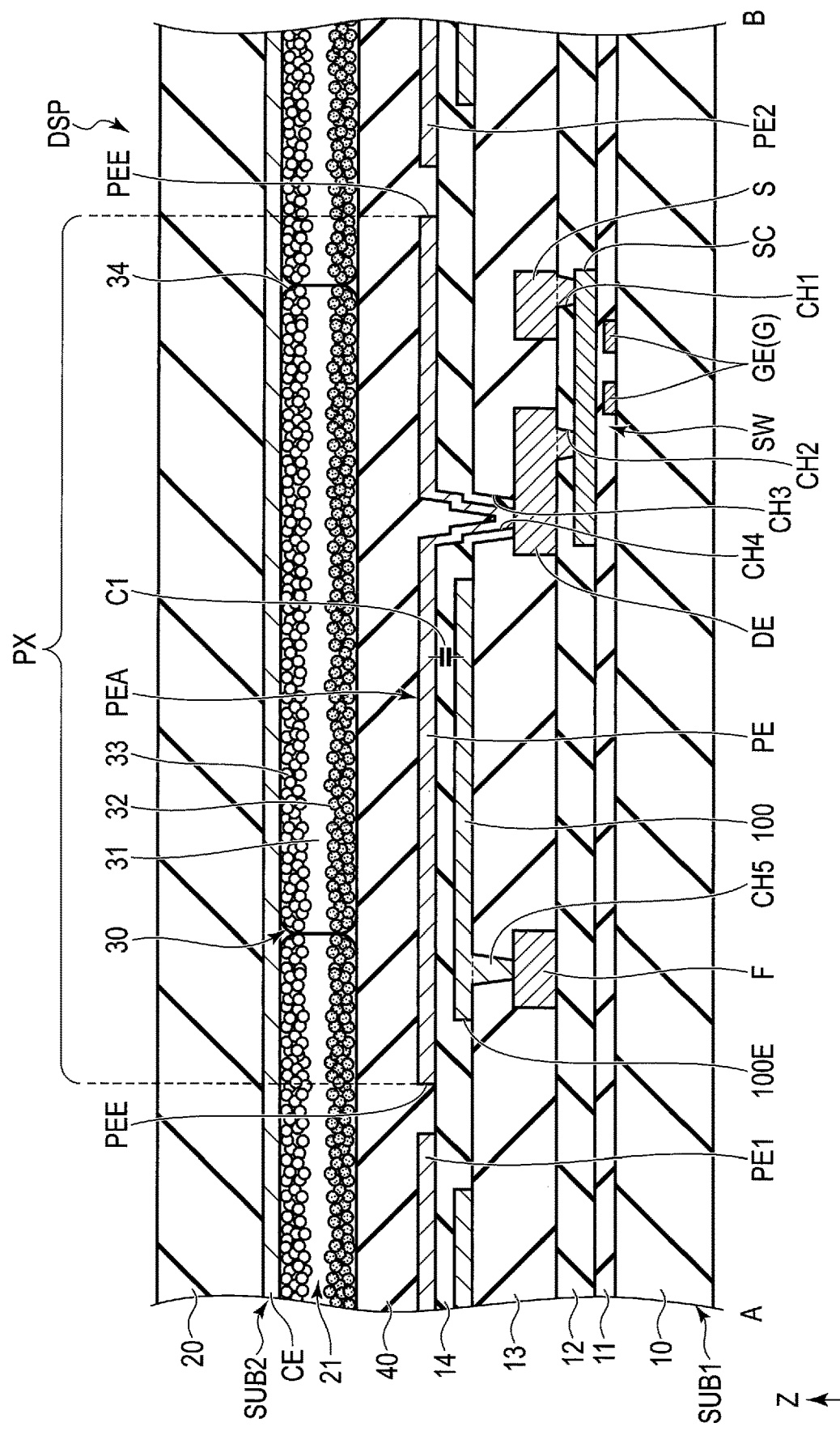
FIG. 3 is a cross-sectional view showing the display device DSP including the pixel PX, taken along line A-B of FIG. 2.

FIG. 3 is a cross-sectional view of the display device DSP including the pixel PX, taken along line A-B of FIG. 2. The first substrate SUB1 further includes a base substrate 10, and insulating films 11 to 14. The base substrate 10 is an insulating substrate formed of an insulative glass or a resin such as polyimide resin. The base substrate 10 is positioned in the opposite side of the observation position with respect to the second substrate SUB2, and thus, may be a non-transparent substrate or may be a transparent substrate.

The gate electrode GE integrated with the scan line G is positioned on the base substrate 10 and is covered with the insulating film 11. The scan line G and the gate electrode GE are formed of a metal material such as aluminum (Al), titanium (Ti), silver (Ag), molybdenum (Mo), tungsten (W), copper (Cu), or chrome (Cr), or an alloy of a combination of these metal materials, and may be formed in a single layer structure or in a layered structure. The semiconductor layer SC is positioned on the insulating film 11 and is covered with the insulating film 12. The semiconductor layer SC is formed of, for example, a polycrystalline silicon (for example, low temperature polysilicon); however, it may be formed of amorphous silicon or a semiconductor oxide. The power supply line F, signal line S, and drain electrode DE are positioned on the insulating film 12 and are covered with the insulating film 13. The power supply line F, signal line S, and drain electrode DE are formed of the same material, and for example, formed of the above-mentioned metal materials. The signal line S is in contact with the semiconductor layer SC in the through hole CH1 passing through the insulating film 12. The drain electrode DE is in contact with the semiconductor layer SC in the through hole CH2 passing through the insulating film 12.

The capacitance electrode 100 is positioned on the insulating film 13 and is covered with the insulating film 14. The capacitance electrode 100 is in contact with the power supply line F in the through hole CH5 passing through the insulating film 13. The capacitance electrode 100 is a transparent electrode formed of a transparent conductive material such as indium tin oxide (ITO) or indium zinc oxide (IZO).

The pixel electrode PE is positioned on the insulating film 14. The pixel electrode PE is in contact with the drain electrode DE in the through hole CH3 passing through the insulating film 13 and the through hole CH4 passing through the insulating film 14. The pixel electrode PE is a transparent electrode formed of a transparent conductive material such as ITO or IZO. The pixel electrode PE overlaps the capacitance electrode 100 through the insulating film 14 and forms a capacitance C1 of the pixel PX.

The insulating film 14 is in contact with the insulating film 13 directly below the edge PEE of the pixel electrode PE. Furthermore, the insulating film 14 is in contact with the insulating film 13 between the pixel electrodes PE1 and PE, and between the pixel electrodes PE and PE2. The pixel electrode PE is positioned directly above the edge 100E of the capacitance electrode 100. As will be described later, the edge PEE may be positioned directly above the edge 100E.

The insulating films 11, 12, and 14 each correspond to an inorganic insulating film formed of an inorganic material such as silicon oxide (SiO), silicon nitride (SiN), or silicon oxynitride (SiON). The insulating films 11, 12, and 14 each may have a single layer structure or a layered structure. The insulating film 13 corresponds to an organic insulating film formed of an organic material such as acrylic resin. The insulating film 13 is thicker than any of the above-mentioned inorganic insulating films (insulating films 11, 12, and 14).

In the first structural example of FIG. 3, the insulating film 14 corresponds to a first interlayer insulating film and the insulating film 13 corresponds to an organic insulating film.

The second substrate SUB2 includes a base substrate 20, common electrode CE, and electrophoretic element 21. In the example depicted, the second substrate SUB2 does not include a light shielding layer defining the pixels PX. The base substrate 20 is formed of an insulative glass or a resin such as polyimide resin. The base substrate 20 is positioned in the observation position side with respect to the first substrate SUB1, and thus, is a transparent substrate. The common electrode CE is positioned between the base substrate 20 and the electrophoretic element 21. The common electrode CE is a transparent electrode formed of a transparent conductive material such as ITO or IZO. The common electrode CE is electrically connected to the power supply pad PD in the non-display part NDA of FIG. 1. That is, the common electrode CE and the capacitance electrode 100 are the same potential. The electrophoretic element 21 is positioned between the pixel electrode PE1 and the common electrode CE. The electrophoretic element 21 is formed of a plurality of microcapsules 30 arranged in the X-Y plane almost without a gap therebetween.

The first substrate SUB1 and the second substrate SUB2 are adhered by an adhesion layer 40. In the example depicted, the adhesion layer 40 is positioned between the pixel electrode PE and the electrophoretic element 21.

The microcapsule 30 has a diameter of approximately 20 to 70 μm. A plurality of microcapsules 30 are arranged between one pixel electrode PE and the common electrode CE. For example, approximately one to ten microcapsules 30 are arranged on the pixel electrode PE of a rectangular shape or a polygonal shape in which one side has a length of approximately one hundred to several hundreds of μm.

The microcapsule 30 includes a dispersion medium 31, a plurality of black particles 32, and a plurality of white particles 33. The black particles 32 and the white particles 33 may be referred to as electrophoretic particles. An outer shell 34 of the microcapsule 30 is formed of a transparent resin such as acrylic resin. The dispersion medium 31 is, in the microcapsule 30, a solution to disperse the black particles 32 and the white particles 33. The black particles 32 are charged with opposite polarity with the white particles 33. For example, the black particles 32 are charged positively and the white particles 33 are charged negatively. Note that the microcapsules 30 may include, in addition to the black particles 32 and the white particles 33, electrophoretic particles of other colors such as red, green, blue, yellow, cyan, and magenta. Furthermore, the electrophoretic particles of other colors may be replaced with at least one of the black particles 32 and the white particles 33.

In the electrophoretic element 21 of above structure, when the pixels PX display black, the pixel electrode PE is maintained high potential in comparison with the common electrode CE. That is, if the potential of the common electrode CE is a reference potential, the pixel electrode PE is maintained to the positive polarity. Thus, the black particles 32 positively charged are pulled to the common electrode CE while the white particles 33 negatively charged are pulled to the pixel electrode PE. As a result, black is recognized when the pixels PX are observed from the above the second substrate SUB2.

On the other hand, when the pixels PX display white, the pixel electrode PE is maintained low potential in comparison with the common electrode CE. That is, if the potential of the common electrode CE is a reference potential, the pixel electrode PE is maintained to the negative polarity. Thus, the white particles 33 negatively charged are pulled to the common electrode CE side while the black particles 32 positively charged are pulled to the pixel electrode PE. As a result, white is recognized when the pixels PX are observed.

Figure 4:
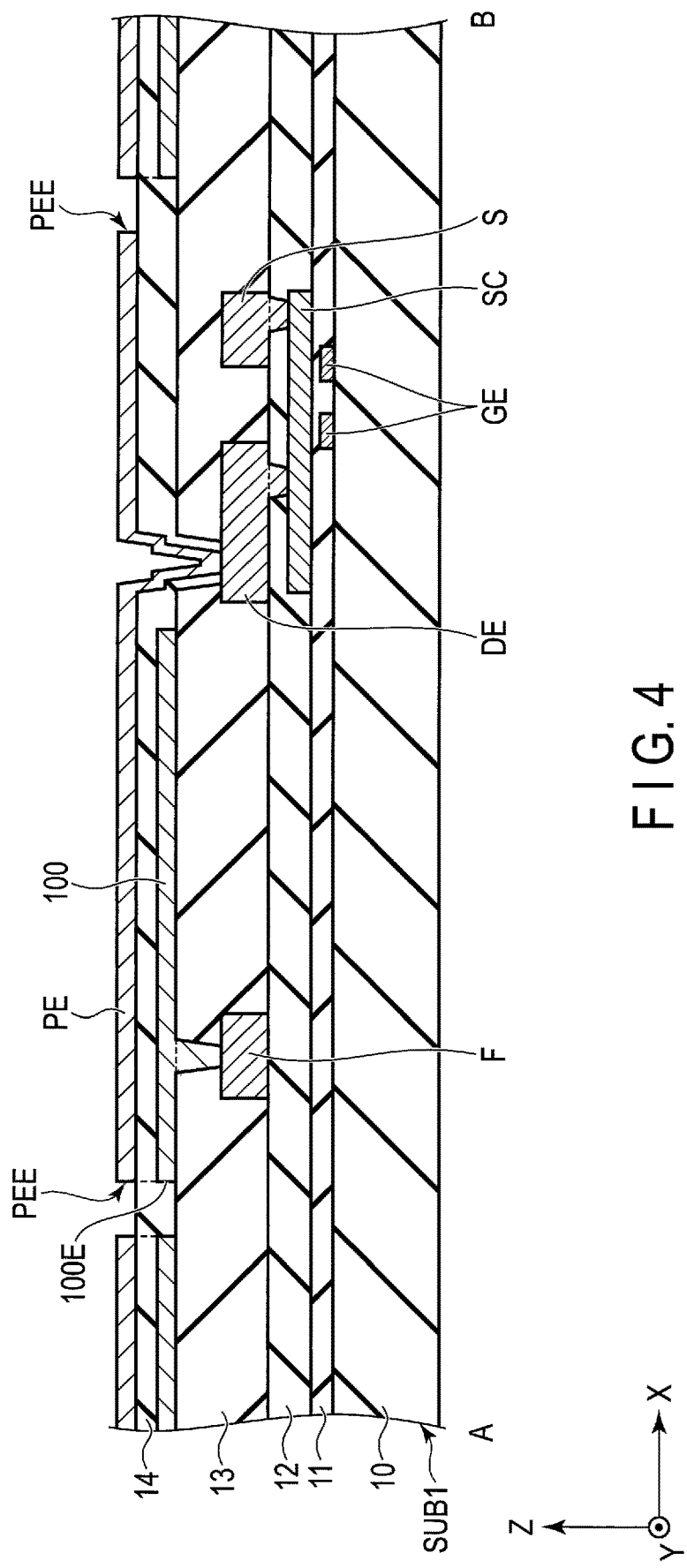
FIG. 4 is a cross-sectional view showing a variation of a first substrate SUB1.

FIG. 4 is a cross-sectional view showing a variation of the first substrate SUB1. In the variation of FIG. 4, an edge 100E overlaps an edge PEE, and in this respect, the variation of FIG. 4 differs from the first structural example of FIG. 3. That is, the edge 100E overlaps the pixel electrode PE over the entire periphery thereof and is at least partly positioned below the edge PEE. The other structures are the same as in the first structural example of FIG. 3.

In the present embodiment, the edge 100E of the capacitance electrode 100 overlaps the pixel electrode PE over the entire periphery thereof and does not extend outside the pixel electrode PE. Thus, leakage of an undesirable electric field from the capacitance electrode 100 affecting the electrophoretic element 21 can be suppressed. Furthermore, the strength of the electric field can be uniformed over substantially the entire surface of the upper surface PEA including the proximity of the edge PEE of the pixel electrode PE. Thus, a malfunction of the electrophoretic element 21 can be suppressed and the deterioration of display quality can be suppressed.

Now, other structural examples will be explained. In each structural example, the same elements as in the first structural example will be referred to by the same reference numbers and the explanation thereof may be omitted.

Figure 5:
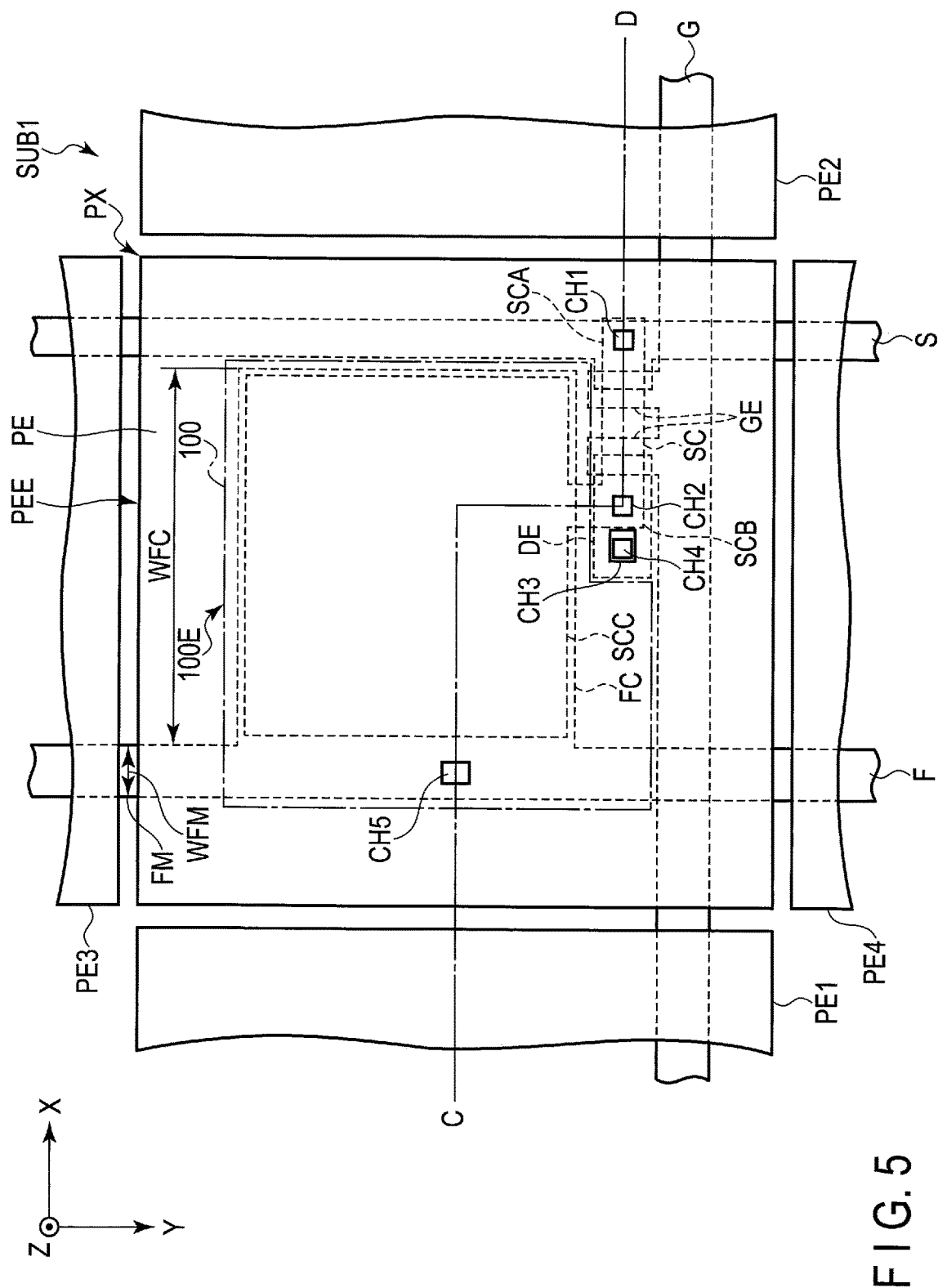
FIG. 5 is a plan view showing a second structural example of a pixel PX of the display device DSP of FIG. 1.

FIG. 5 is a plan view showing a second structural example of a pixel PX of the display device DSP of FIG. 1. In the second structural example of FIG. 5, the semiconductor layer SC includes a capacitance part SCC and the power supply line F includes a capacitance part FC, and in this respect, the second structural example of FIG. 5 differs from the first structural example of FIG. 2.

That is, the semiconductor layer SC extends further into the pixel PX than the end SCB connected to the drain electrode DE and forms a capacitance part SCC. For example, the capacitance part SCC has an area greater than a range between the end SCA and the end SCB.

The power supply line F extends toward the signal line S in the pixel PX and forms a capacitance part FC. The main body FM of the power supply line F has a substantially constant width WFM. The width WFC of the capacitance part FC is greater than the width WFM of the main body FM. The widths are lengths along the first direction X. The width WFM is a width of the part between the pixel electrodes PE and PE3. The width WFC is a width of the part projecting from the main body FM toward the signal line S. The capacitance part FC overlaps the capacitance part SCC. In the example depicted, the capacitance parts SCC and FC overlap the capacitance electrode 100.

Furthermore, as in the first structural example, the edge 100E of the capacitance electrode 100 overlaps the pixel electrode PE over the entire periphery thereof in a plan view.

Figure 6:
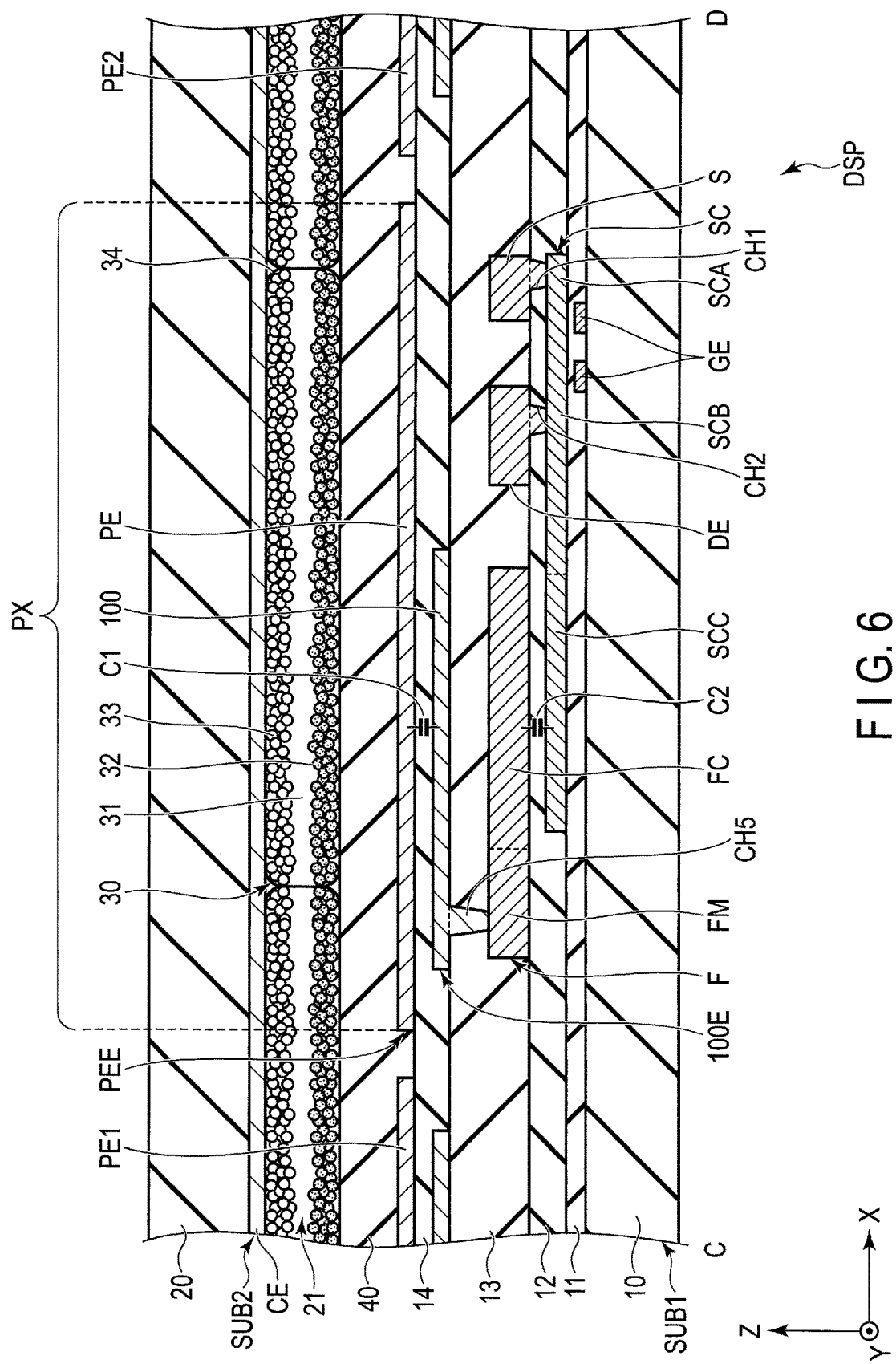
FIG. 6 is a cross-sectional view showing the display device DSP including the pixel PX, taken along line C-D of FIG. 5.

FIG. 6 is a cross-sectional view of the display device DSP including the pixel PX, taken along line C-D of FIG. 5. As in the first structural example of FIG. 3, the pixel electrode PE overlaps the capacitance electrode 100 with the insulating film 14 interposed therebetween and forms a capacitance C1 of the pixel PX. Furthermore, the capacitance part FC overlaps the capacitance part SCC with the insulating film 12 interposed therebetween and forms a capacitance C2 of the pixel PX. The capacitance part SCC and the capacitance part FC are positioned directly below the pixel electrode PE and the capacitance electrode 100.

In the second structural example of FIGS. 5 and 6, the insulating film 14 corresponds to a first interlayer insulating film, the insulating film 13 corresponds to an organic insulating film, the insulating film 12 corresponds to a second interlayer insulating film, the capacitance part SCC corresponds to a first capacitance part, and the capacitance part FC corresponds to a second capacitance part.

Such a second structural example can achieve the advantages obtained in the above-described first structural example as well. Furthermore, in each pixel PX, the capacitance C2 between the capacitance parts SCC and FC can be formed in addition to the capacitance C1 between the pixel electrode PE and the capacitance electrode 100. The capacitances C1 and C2 are formed of multi-layered conductive layer, and thus, a greater capacitance can be produced even if the size of the pixel PX is small.

Figure 7:
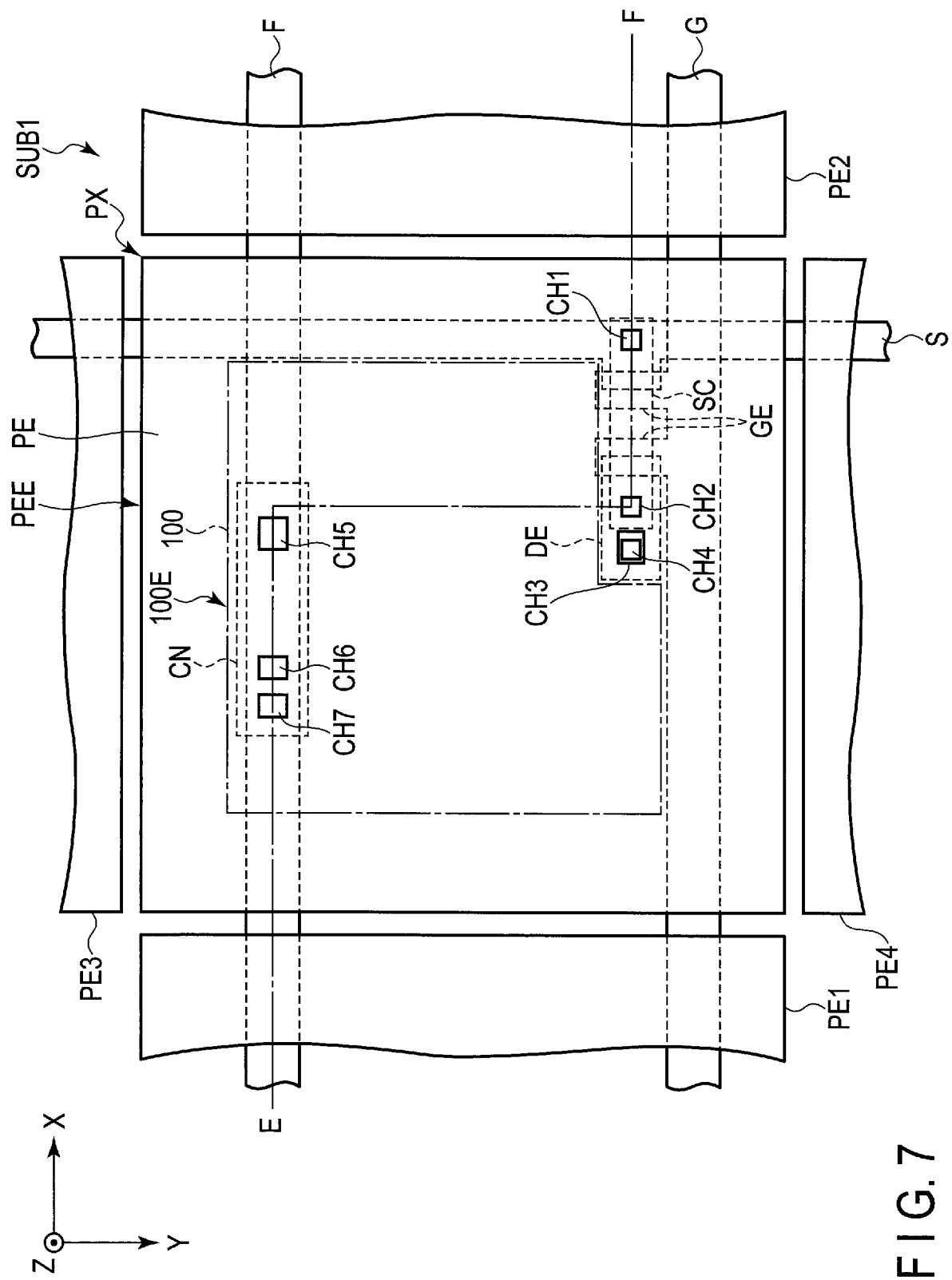
FIG. 7 is a plan view showing a third structural example of a pixel PX of the display device DSP of FIG. 1.

FIG. 7 is a plan view showing a third structural example of a pixel PX of the display device DSP of FIG. 1. In the third structural example of FIG. 7, the power supply line F extends in the first direction X, and in this respect, the third structural example of FIG. 7 differs from the first structural example of FIG. 2. The power supply line F and the scan line G are arranged in the second direction Y with a gap. The connection electrode CN overlaps the power supply line F and is electrically connected to the power supply line F in through holes CH6 and CH7. Furthermore, the capacitance electrode 100 overlaps the connection electrode CN and is electrically connected to the connection electrode CN in the through hole CH5. The capacitance electrode 100 further overlaps the power supply line F in a plan view.

Furthermore, as in the first structural example, the edge 100E of the capacitance electrode 100 overlaps the pixel electrode PE over the entire periphery thereof in a plan view.

Figure 8:
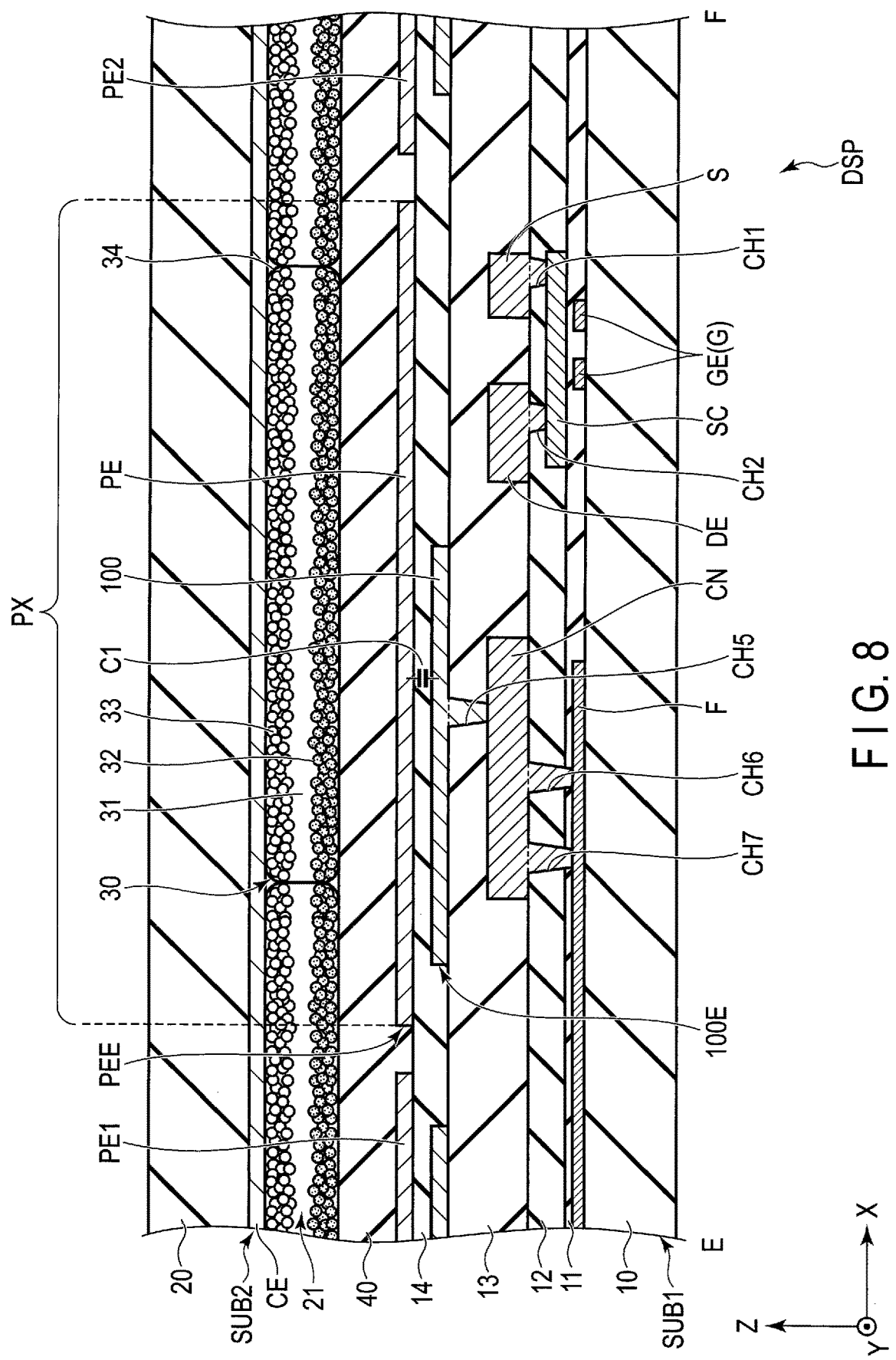
FIG. 8 is a cross-sectional view showing the display device DSP including the pixel PX, taken along line E-F of FIG. 7.

FIG. 8 is a cross-sectional view of the display device DSP including the pixel PX, taken along line E-F of FIG. 7. The power supply line F is, as with the scan line G, positioned between the base substrate 10 and the insulating film 11. The power supply line F and the scan line G are formed of the same material. The connection electrode CN is, as with the signal line S and the drain electrode DE, positioned between the insulating films 12 and 13. The connection electrode CN and the signal line S are formed of the same material. The connection electrode CN is in contact with the power supply line F in the through holes CH6 and CH7 passing through the insulating films 11 and 12. The capacitance electrode 100 is in contact with the connection electrode CN in the through hole CH5 passing through the insulating film 13.

Such a third structural example can achieve the advantages obtained in the above-described first structural example as well.

Furthermore, in the third structural example, the connection electrode CN is positioned between the inorganic insulating film 12 and the organic insulating film 13, and the connection electrode CN is connected both the power supply line F and the capacitance electrode 100. In the third structural example in which the inorganic insulating films 11 and 12 and the organic insulating film 13 are interposed between the power supply line F and the capacitance electrode 100, disconnection between the power supply line F and the capacitance electrode 100 can be suppressed.

Figure 9:
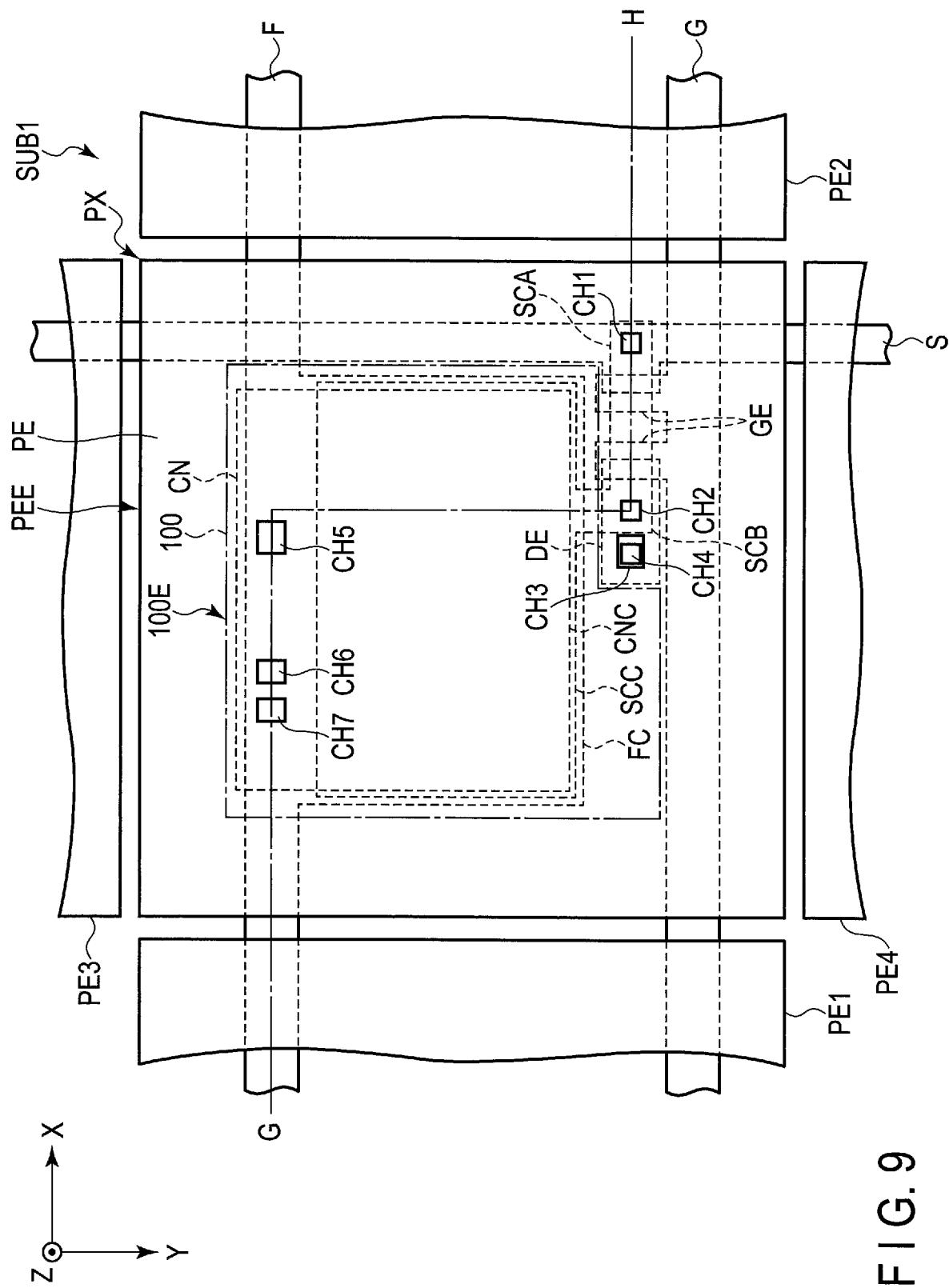
FIG. 9 is a plan view showing a fourth structural example of a pixel PX of the display device DSP of FIG. 1.

FIG. 9 is a plan view showing a fourth structural example of a pixel PX of the display device DSP of FIG. 1. In the fourth structural example of FIG. 9, the semiconductor layer SC includes a capacitance part SCC, the power supply line F includes a capacitance part FC, and the connection electrode CN includes a capacitance part CNC, and in this respect, the fourth structural example of FIG. 9 differs from the third structural example of FIG. 8.

That is, the power supply line F extends toward the scan line G in the pixel PX and forms the capacitance part FC. The connection electrode CN extends toward the scan line G in the pixel PX and forms the capacitance part CNC. The capacitance part FC overlaps the capacitance part SCC. The capacitance part SCC overlaps the capacitance part CNC. In the example depicted, the capacitance parts FC, SCC, and CNC overlap the capacitance electrode 100.

Figure 10:
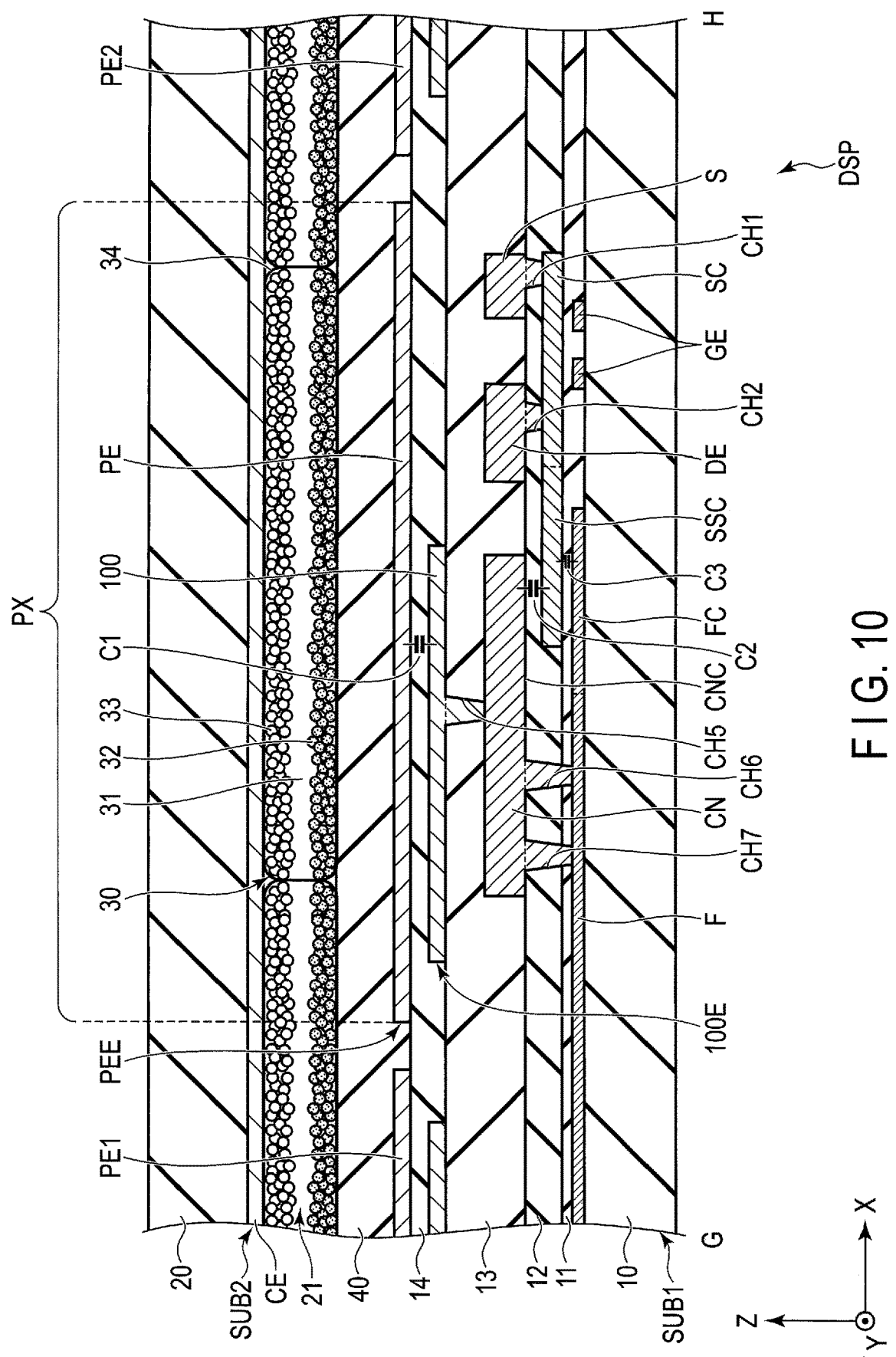
FIG. 10 is a cross-sectional view showing the display device DSP including the pixel PX, taken along line G-H of FIG. 9.

FIG. 10 is a cross-sectional view of the display device DSP including the pixel PX, taken along line G-H of FIG. 9. As in the third structural example of FIG. 8, the pixel electrode PE overlaps the capacitance electrode 100 with the insulating film 14 interposed therebetween and forms a capacitance C1 of the pixel PX. In addition, the capacitance part CNC overlaps the capacitance part SCC with the insulating film 12 interposed therebetween and forms a capacitance C2 of the pixel PX. Furthermore, the capacitance part SCC overlaps the capacitance part FC with the insulating film 11 interposed therebetween and forms a capacitance C3 of the pixel PX. The capacitance parts FC, SCC, and CNC are positioned directly below the pixel electrode PE and the capacitance electrode 100.

In the fourth structural example of FIGS. 9 and 10, the insulating film 14 corresponds to a first interlayer insulating film, the insulating film 13 corresponds to an organic insulating film, the insulating film 12 corresponds to a second interlayer insulating film, the insulating film 11 corresponds to a third interlayer insulating film, the capacitance part SCC corresponds to a first capacitance part, the capacitance part CNC corresponds to a second capacitance part, and the capacitance part FC corresponds to a third capacitance part.

Such a fourth structural example can achieve the advantages obtained in the above-described third structural example as well. Furthermore, in each pixel PX, the capacitance C2 between the capacitance parts SCC and CNC and the capacitance C3 between the capacitance parts SCC and FC can be formed in addition to the capacitance C1. The capacitances C1 to C3 are formed of a multi-layered conductive layer, and thus, a greater capacitance can be produced even if the size of the pixel PX is small.

Figure 11:
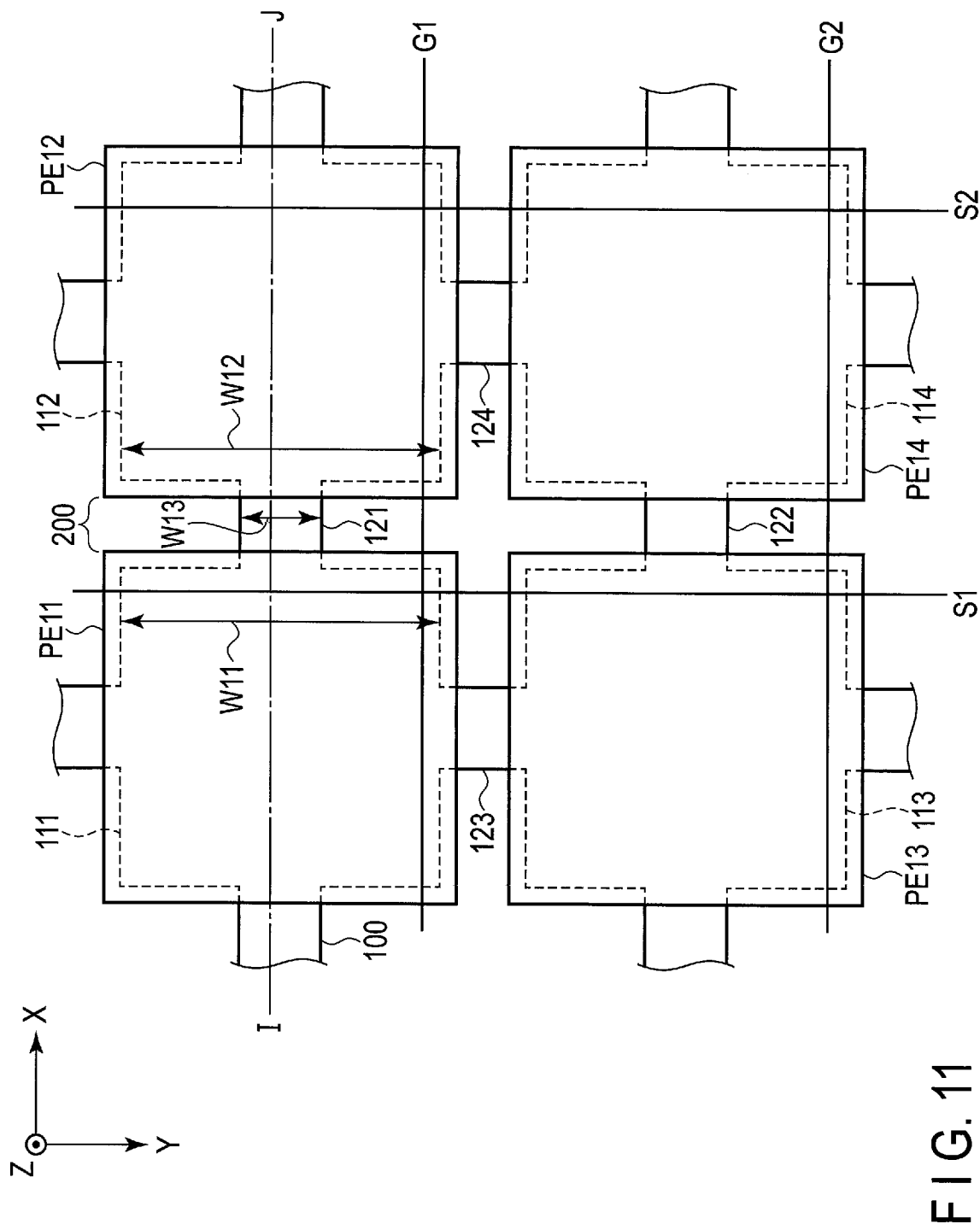
FIG. 11 is a plan view showing a fifth structural example of a pixel PX of the display device DSP of FIG. 1.

FIG. 11 is a plan view showing a fifth structural example of a pixel PX of the display device DSP of FIG. 1. The pixel electrodes PE11 to PE14 are arranged in a matrix. The capacitance electrode 100 includes capacitance parts 111 to 114 overlapping pixel electrodes PE11 to PE14, respectively, and connection parts 121 to 124. In the example depicted, the pixel electrodes PE11 and PE12 are arranged in the first direction X with a gap part 200. Furthermore, the pixel electrodes PE13 and PE14 are arranged in the first direction X with a gap part 200. The connection part 121 overlaps the gap part 200 and connects the capacitance parts 111 and 112. Furthermore, the connection part 122 overlaps the gap part 200 and connects the capacitance parts 113 and 114. Similarly, the connection part 123 connects the capacitance parts 111 and 113 arranged in the second direction Y and connection part 124 connects the capacitance parts 112 and 114 arranged in the second direction Y.

The pixel electrodes PE11 to PE14 have the same shape and the same area. For example, the pixel electrodes PE11 and PE12 have widths W11 and W12, respectively. The connection part 121 includes a width W13. The widths W11 to W13 are lengths along the second direction Y. The widths W11 and W12 are equal. The width W13 is less than the widths W11 and W12.

In the example depicted, the connection parts 121 to 124 do not overlap the scan line or the signal line. For example, the scan line C1 overlaps the pixel electrodes PE11 and PE12 and the capacitance parts 111 and 112; however, it does not overlap the connection part 121. Similarly, the scan line G2 does not overlap the connection part 122. The signal line S1 overlaps the pixel electrodes PE11 and PE13 and the capacitance parts 111 and 113; however, it does not overlap the connection part 123. Similarly, the signal line 52 does not overlap the connection part 124.

Figure 12:
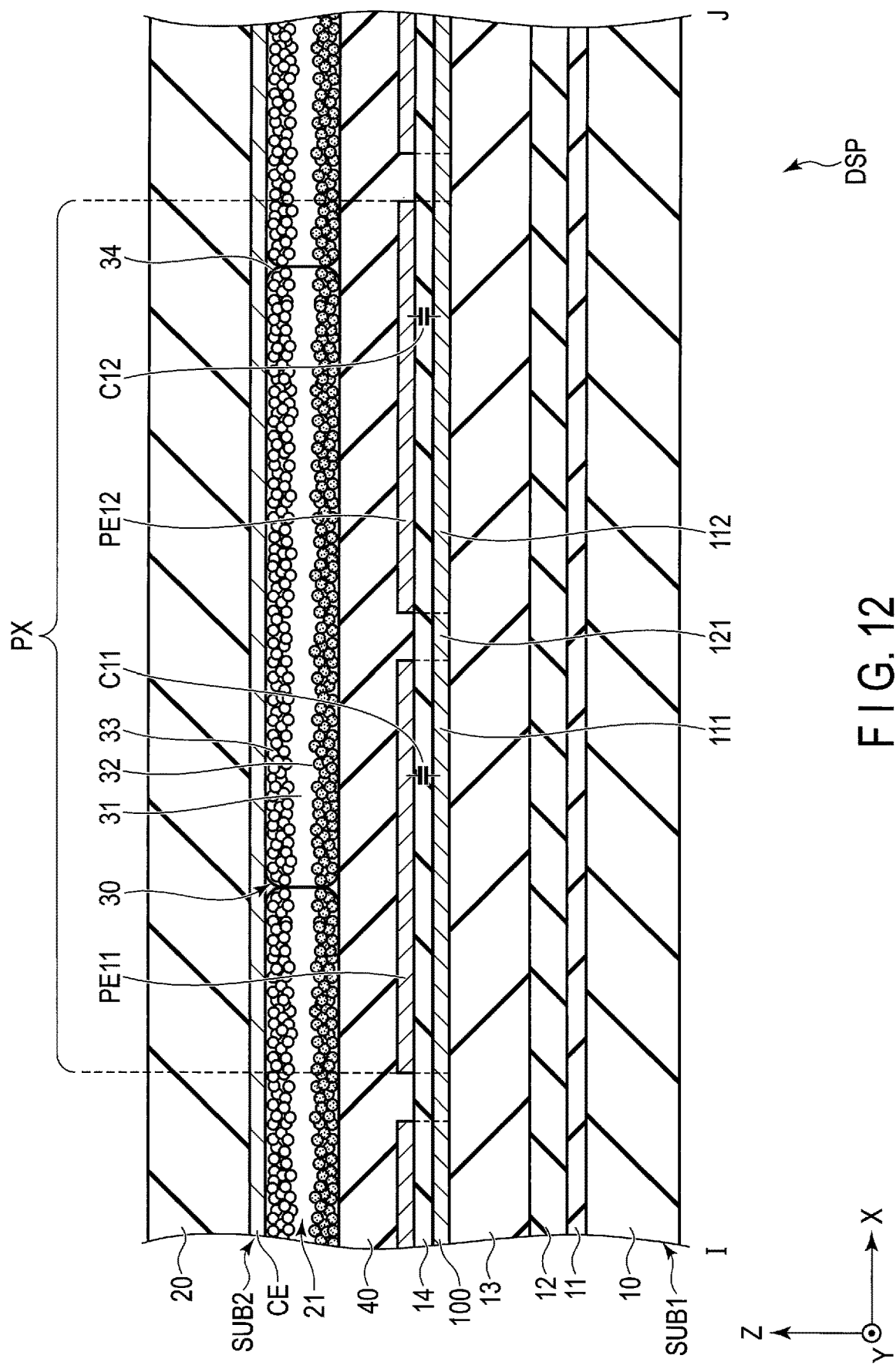
FIG. 12 is a cross-sectional view showing the display device DSP including the pixel PX, taken along line I-J of FIG. 11.

FIG. 12 is a cross-sectional view of the display device DSP including the pixel PX, taken along line I-J of FIG. 11. The capacitance electrode 100 is positioned between the insulating films 13 and 14. The pixel electrode PE11 overlaps the capacitance part 111 with the insulating film 14 interposed therebetween and forms a capacitance C11. The pixel electrode PE12 overlaps the capacitance part 112 with the insulating film 14 interposed therebetween and forms a capacitance C12. The connection part 121 is formed integrally with the capacitance parts 111 and 112.

In the fifth structural example of FIGS. 11 and 12, the pixel electrode PE 11 corresponds to a first pixel electrode, the pixel electrode PE12 corresponds to a second pixel electrode, the capacitance part 111 corresponds to a first capacitance part, the capacitance part 112 corresponds to a second capacitance part, and the insulating film 14 corresponds to a first interlayer insulating film.

In such a fifth structural example, parts of the capacitance electrode 100 which is positioned outside the pixel electrodes PE11 to PE14 are connection parts 121 to 124, and each of the connection parts 121 to 124 has a width which is less than that of the capacitance parts 111 to 114. Thus, as compared to a case where the connection parts 121 to 124 and the capacitance parts 111 to 114 have a similar width, leakage of an undesired electric field in each of the connection parts 121 to 124 can be decreased.

Figure 13:
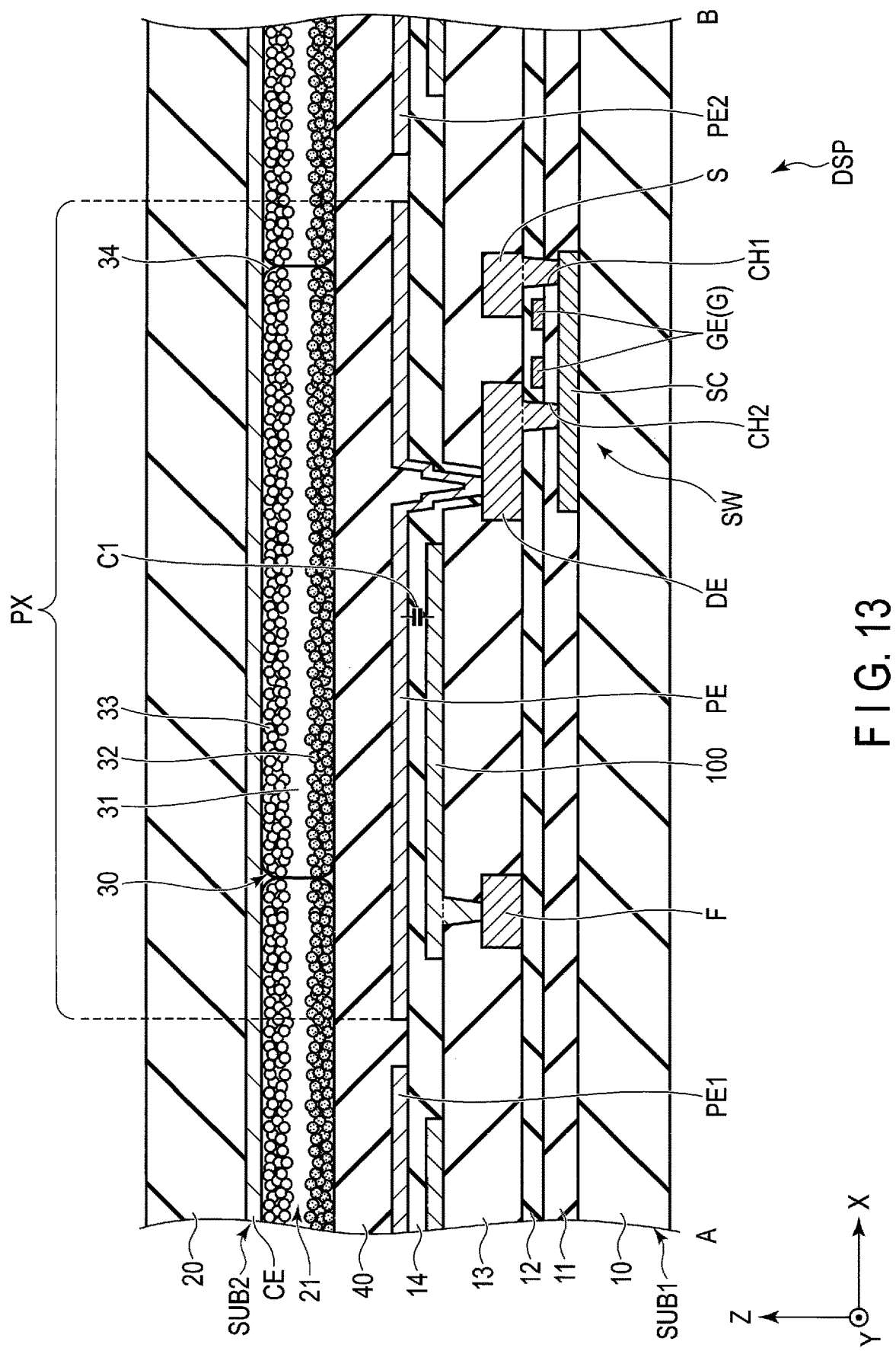
FIG. 13 is a plan view showing a sixth structural example of a pixel PX of the display device DSP of FIG. 1.

FIG. 13 is a cross-sectional view showing a sixth structural example of a pixel PX of the display device DSP of FIG. 1. The sixth structural example of FIG. 13 includes a switching element SW of top gate structure and the sixth structural example is different from the first structural example of FIG. 3 in this respect. That is, the semiconductor layer SC is positioned between the base substrate 10 and the insulating film 11. Note that another insulating film may be interposed between the base substrate 10 and the semiconductor layer SC. The gate electrode GE integrated with the scan line G is positioned between the insulating films 11 and 12. The signal line S is in contact with the semiconductor layer SC in the through hole CH1 passing through the insulating films 11 and 12. The drain electrode DE is in contact with the semiconductor layer SC in the through hole CH2 passing through the insulating films 11 and 12. The other structure is the same as in the first structural example.

In the sixth structural example, the same advantages obtained in the first structural example are achieved as well.

As can be understood from the above, in the present embodiment, a display device which can suppress deterioration of display quality can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Examples of the display device with the structures disclosed in the present application will be noted below.

(1)

A display device comprising:

a base substrate;

a switching element including a semiconductor layer;

a power supply line;

a pixel electrode electrically connected to the switching element;

a capacitance electrode positioned between the base substrate and the pixel electrode and electrically connected to the power supply line;

a first interlayer insulating film positioned between the pixel electrode and the capacitance electrode;

a common electrode; and an electrophoretic element positioned between the pixel electrode and the common electrode, wherein an edge of the capacitance electrode overlaps the pixel electrode over the entire periphery thereof.

(2)

The display device of (1), wherein the capacitance electrode is a transparent electrode.

(3)

The display device of (1), further comprising an organic insulating film positioned between the power supply line and the capacitance electrode, wherein the first interlayer insulating film is in contact with the organic insulating film directly below the edge of the pixel electrode.

(4)

The display device of (1), further comprising a scan line extending in a first direction, and a signal line extending in a second direction which crosses the first direction, wherein the power supply line and the signal line are positioned in the same layer, and the power supply line extends in the second direction.

(5)
The display device of (4), further comprising a second interlayer insulating film positioned between the semiconductor layer and the power supply line, wherein
the semiconductor layer includes a first capacitance part, and
the power supply line includes a second capacitance part overlapping the first capacitance part with the second interlayer insulating film interposed therebetween.

(6)
The display device of (5), wherein the second capacitance part extends toward the signal line.

(7)
The display device of (6), wherein the first capacitance part and the second capacitance part overlap the capacitance electrode.

(8)
The display device of (1), further comprising a scan line extending in a first direction, and a signal line extending in a second direction which crosses the first direction, wherein
the power supply line and the scan line are positioned in the same layer, and the power supply line extends in the first direction.

(9)
The display device of (8), further comprising a connection electrode positioned between the power supply line and the capacitance electrode and connected to both the power supply line and the capacitance electrode.

(10)
The display device of (9), wherein the connection electrode and the signal line are positioned in the same layer.

(11)
The display device of (10), further comprising a second interlayer insulating film positioned between the semiconductor layer and the connection electrode, wherein
the semiconductor layer includes a first capacitance part, and
the connection electrode includes a second capacitance part overlapping the first capacitance part with the second interlayer insulating film interposed therebetween.

(12)
The display device of (11), further comprising a third interlayer insulating film positioned between the power supply line and the semiconductor layer, wherein
the power supply line includes a third capacitance part overlapping the first capacitance part with the third interlayer insulating film interposed therebetween.

(13)
The display device of (12), wherein the third capacitance part extends toward the scan line.

(14)
The display device of (13), wherein the first capacitance part, the second capacitance part, and the third capacitance part overlap the capacitance electrode.

(15)
A display device comprising:
a base substrate;
a first pixel electrode and a second pixel electrode arranged aside with a gap part;
a capacitance electrode including a first capacitance part positioned between the base substrate and the first pixel electrode, a second capacitance part positioned between the base substrate and the second pixel electrode, and a connection part connecting the first capacitance part and the second capacitance part;
a first interlayer insulating film positioned between the first pixel electrode and the first capacitance part and between the second pixel electrode and the second capacitance part;
a common electrode; and
an electrophoretic element positioned between the first pixel electrode and the common electrode and between the second pixel electrode and the common electrode, wherein
the first capacitance part overlaps the first pixel electrode,
the second capacitance part overlaps the second pixel electrode,
the connection part overlaps the gap part, and
a width of the connection part is less than each width of the first capacitance part and the second capacitance part.

(16)
The display device of (15), further comprising a scan line extending in a first direction, and a signal line extending in a second direction which crosses the first direction, wherein
the connection part does not overlap the scan line or the signal line.

(17)
A display device comprising:
a base substrate;
a switching element including a semiconductor layer;
a power supply line;
a pixel electrode electrically connected to the switching element;
an organic insulating film positioned between the power supply line and the pixel electrode;
a capacitance electrode positioned between the organic insulating film and the pixel electrode and connected to the power supply line in a through hole passing through the organic insulating film; and
a first interlayer insulating film positioned between the pixel electrode and the capacitance electrode, wherein
the capacitance electrode is a transparent electrode, and
an edge of the capacitance electrode overlaps the pixel electrode over the entire periphery thereof.

(18)
The display device of (17), wherein the first interlayer insulating film is in contact with the organic insulating film directly below the pixel electrode.

(19)
The display device of (17), further comprising a scan line extending in a first direction, and a signal line extending in a second direction which crosses the first direction, wherein
the power supply line and the signal line are positioned in the same layer, and the power supply line extends in the second direction.

(20)
The display device of (19), further comprising a second interlayer insulating film positioned between the semiconductor layer and the power supply line, wherein
the semiconductor layer includes a first capacitance part, and
the power supply line includes a second capacitance part overlapping the first capacitance part with the second interlayer insulating film interposed therebetween.

(21)
The display device of (17), further comprising a scan line extending in a first direction, and a signal line extending in a second direction which crosses the first direction, wherein
the power supply line and the scan line are positioned in the same layer, and the power supply line extends in the first direction.

(22)

The display device of (21), further comprising: a second interlayer insulating film positioned between the semiconductor layer and the connection electrode; and a third interlayer insulating film positioned between the power supply line and the semiconductor layer, wherein the semiconductor layer includes a first capacitance part, the connection electrode includes a second capacitance part overlapping the first capacitance part with the second interlayer insulating film interposed therebetween, and the power supply line includes a third capacitance part overlapping the first capacitance part with the third interlayer insulating film interposed therebetween.

What is claimed is:

1. A display device comprising:
a base substrate;
a switching element including a semiconductor layer;
a power supply line;
a pixel electrode electrically connected to the switching element;
a capacitance electrode positioned between the base substrate and the pixel electrode and electrically connected to the power supply line;
a first interlayer insulating film positioned between the pixel electrode and the capacitance electrode;
an organic insulating film positioned between the power supply line and the capacitance electrode;
a common electrode; and
an electrophoretic element positioned between the pixel electrode and the common electrode, wherein
an edge of the capacitance electrode overlaps the pixel electrode over the entire periphery thereof, and
the first interlayer insulating film is in contact with the organic insulating film directly below an edge of the pixel electrode.

2. The display device of claim 1, wherein the capacitance electrode is a transparent electrode.

3. The display device of claim 1, further comprising a scan line extending in a first direction, and a signal line extending in a second direction which crosses the first direction, wherein
the power supply line and the signal line are positioned in the same layer, and the power supply line extends in the second direction.

4. The display device of claim 3, further comprising a second interlayer insulating film positioned between the semiconductor layer and the power supply line, wherein
the semiconductor layer includes a first capacitance part, and
the power supply line includes a second capacitance part overlapping the first capacitance part with the second interlayer insulating film interposed therebetween.

5. The display device of claim 4, wherein the second capacitance part extends toward the signal line.

6. The display device of claim 5, wherein the first capacitance part and the second capacitance part overlap the capacitance electrode.

7. The display device of claim 1, further comprising a scan line extending in a first direction, and a signal line extending in a second direction which crosses the first direction, wherein
the power supply line and the scan line are positioned in the same layer, and the power supply line extends in the first direction.

8. The display device of claim 7, further comprising a connection electrode positioned between the power supply line and the capacitance electrode and connected to both the power supply line and the capacitance electrode.

9. The display device of claim 8, wherein the connection electrode and the signal line are positioned in the same layer.

10. The display device of claim 9, further comprising a second interlayer insulating film positioned between the semiconductor layer and the connection electrode, wherein
the semiconductor layer includes a first capacitance part, and
the connection electrode includes a second capacitance part overlapping the first capacitance part with the second interlayer insulating film interposed therebetween.

11. The display device of claim 10, further comprising a third interlayer insulating film positioned between the power supply line and the semiconductor layer, wherein
the power supply line includes a third capacitance part overlapping the first capacitance part with the third interlayer insulating film interposed therebetween.

12. The display device of claim 11, wherein the third capacitance part extends toward the scan line.

13. The display device of claim 12, wherein the first capacitance part, the second capacitance part, and the third capacitance part overlap the capacitance electrode.

14. A display device comprising:
a base substrate;
a first pixel electrode and a second pixel electrode arranged aside with a gap part;
a capacitance electrode including a first capacitance part positioned between the base substrate and the first pixel electrode, a second capacitance part positioned between the base substrate and the second pixel electrode, and a connection part connecting the first capacitance part and the second capacitance part;
a first interlayer insulating film positioned between the first pixel electrode and the first capacitance part and between the second pixel electrode and the second capacitance part;
a common electrode; and
an electrophoretic element positioned between the first pixel electrode and the common electrode and between the second pixel electrode and the common electrode, wherein
the first capacitance part overlaps the first pixel electrode,
the second capacitance part overlaps the second pixel electrode,
the connection part overlaps the gap part, and
a width of the connection part is less than each width of the first capacitance part and the second capacitance part.

15. The display device of claim 14, further comprising a scan line extending in a first direction, and a signal line extending in a second direction which crosses the first direction, wherein
the connection part does not overlap the scan line or the signal line.

16. A display device comprising:
a base substrate;
a switching element including a semiconductor layer;
a power supply line;
a pixel electrode electrically connected to the switching element;
an organic insulating film positioned between the power supply line and the pixel electrode;
a capacitance electrode positioned between the organic insulating film and the pixel electrode and connected to the power supply line in a through hole passing through the organic insulating film; and a first interlayer insulating film positioned between the pixel electrode and the capacitance electrode, wherein the capacitance electrode is a transparent electrode, an edge of the capacitance electrode overlaps the pixel electrode over the entire periphery thereof, and the first interlayer insulating film is in contact with the organic insulating film directly below the pixel electrode.

17. The display device of claim 16, further comprising a scan line extending in a first direction, and a signal line extending in a second direction which crosses the first direction, wherein the power supply line and the signal line are positioned in the same layer, and the power supply line extends in the second direction.

18. The display device of claim 17, further comprising a second interlayer insulating film positioned between the semiconductor layer and the power supply line, wherein the semiconductor layer includes a first capacitance part, and the power supply line includes a second capacitance part overlapping the first capacitance part with the second interlayer insulating film interposed therebetween.

19. The display device of claim 16, further comprising a scan line extending in a first direction, and a signal line extending in a second direction which crosses the first direction, wherein the power supply line and the scan line are positioned in the same layer, and the power supply line extends in the first direction.

20. The display device of claim 19, further comprising:

a connection electrode positioned between the power supply line and the capacitance electrode and connected to both the power supply line and the capacitance electrode;

a second interlayer insulating film positioned between the semiconductor layer and the connection electrode; and a third interlayer insulating film positioned between the power supply line and the semiconductor layer, wherein the semiconductor layer includes a first capacitance part, the connection electrode includes a second capacitance part overlapping the first capacitance part with the second interlayer insulating film interposed therebetween, and the power supply line includes a third capacitance part overlapping the first capacitance part with the third interlayer insulating film interposed therebetween.

* * * * *